United States Patent
Sites

(10) Patent No.: US 6,728,880 B1
(45) Date of Patent: Apr. 27, 2004

(54) SECURE TIME ON COMPUTERS WITH INSECURE CLOCKS

(75) Inventor: Richard L. Sites, Menlo Park, CA (US)

(73) Assignee: Adobe Systems Incorporated, San Jose, CA (US)

(\*) Notice: Subject to any disclaimer, the term of this patent is extended or adjusted under 35 U.S.C. 154(b) by 0 days.

(21) Appl. No.: 09/398,232

(22) Filed: Sep. 17, 1999

(51) Int. Cl.[7] ................................................ H04L 9/30
(52) U.S. Cl. ........................ 713/178; 713/503; 713/400
(58) Field of Search ................................ 713/178, 503, 713/400, 401, 502; 709/248; 380/30

(56) References Cited

U.S. PATENT DOCUMENTS

| | | | | |
|---|---|---|---|---|
| 5,327,468 A | \* | 7/1994 | Edblad et al. ............... 375/356 |
| 5,392,421 A | \* | 2/1995 | Lennartsson ................ 713/400 |
| 5,444,780 A | \* | 8/1995 | Hartman, Jr. ................. 380/30 |
| 5,500,897 A | \* | 3/1996 | Hartman, Jr. ................ 713/178 |
| 5,521,887 A | \* | 5/1996 | Loomis ........................ 368/47 |
| 5,826,066 A | \* | 10/1998 | Jardine et al. ............... 713/400 |

\* cited by examiner

*Primary Examiner*—Gilberto Barrón
*Assistant Examiner*—Joseph M McArdle
(74) *Attorney, Agent, or Firm*—Fish & Richardson P.C.

(57) ABSTRACT

Methods and apparatus, including computer program apparatus and a system, for providing a trusted time. A first local time from a computer is sent to a trusted server. Trusted time data protected by encryption or a digital signature is received from the trusted server. The invention stores the trusted time data on the computer and checks the validity of the trusted time data. The trusted time data is used on the computer to compute a trusted time corresponding to a local time.

27 Claims, 2 Drawing Sheets

SECURE TIME ON COMPUTERS WITH INSECURE CLOCKS

BACKGROUND OF THE INVENTION

The present invention relates to time identification on a computer.

Computers generally contain clock circuits, and these local clock circuits operate to maintain time on the computer. The local clock circuits can be reset by users so that a computer's local time can be any value. Therefore, a computer may have a local time that is different from time on any other clock. In some situations, it is necessary for a computer program to obtain a trusted time, for example, Greenwich Mean Time (GMT), that is, a time that can be relied upon as being correct in the sense that it is not subject to user manipulation. Ordinarily, computers obtain a trusted time by being actively connected to a special device or to a network that can provide the trusted time in a secure way to the computer.

SUMMARY OF THE INVENTION

In general, in one aspect, the invention provides techniques that can be implemented as methods, systems, or apparatus, including computer program apparatus, for providing a trusted time. The techniques include sending a first local time from a computer to a trusted server, receiving trusted time data protected by a digital signature from the trusted server, storing the trusted time data on the computer, checking the validity of the trusted time data, and using the trusted time data to compute a trusted time. Advantageously, in one implementation, the computer has a read-only local counter securely coupled to its local clock circuit, the local counter and the local clock circuit operating to change a counter value of the local counter whenever the local clock circuit is reset in a way that resets the local time provided by the local clock circuit.

Advantages that can be seen in implementations of the invention include one or more of the following. A process running on a computer can determine a trusted time securely without being continuously connected to a special device or a network even in a situation where the computer's local clock circuit is not secure. A process running on a computer can determine securely the difference between a trusted time and a local time. A process running on a computer can check the a validity of a time difference, saved on the computer, between a trusted time and a local time. A process running on a computer can maintain the security of a document security scheme that depends on knowing a correct time, such as GMT, without requiring the computer to be tethered (i.e., actively connected) to a secure time source.

The details of one or more embodiments of the invention are set forth in the accompanying drawings and the description below. Other features and advantages of the invention will become apparent from the description, the drawings, and the claims.

DETAILED DESCRIPTION

Figure 1:
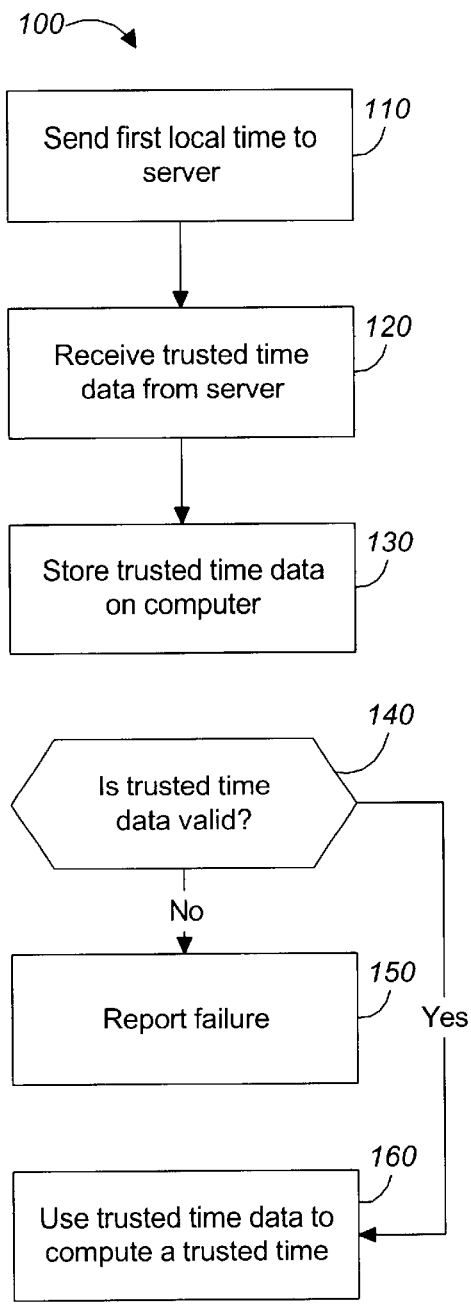
FIG. 1 is a flow diagram illustrating a method for providing a trusted time in accordance with the invention.

FIG. 1 illustrates a method 100 for providing a trusted time. The method 100 can be implemented in a computer program running on a computer, such as a module in a personal computer, a module in a personal digital assistant, or a module in a digital appliance, or otherwise. A digital appliance is any kind of equipment with an embedded computer, which may be as simple as single integrated circuit containing a processor, memory for storing instructions executed by the processor, memory for storing data, and input/output interface circuitry. A first local time is obtained from a local clock circuit on the computer and sent to a trusted server (step 110), which may be in communication with the computer over a network such as a local area network or a wide area network like the Internet. The trusted server is a device or a process that keeps a trusted time. The trusted time can be a standard time reference, such as Greenwich Mean Time (GMT) or Universal Time (UT). Then, the computer receives trusted time data from the trusted server (step 120). In one embodiment, trusted time data includes a time difference, the time difference being the difference between the sent local time and the trusted time on the server. The trusted time data is stored on the computer (step 130).

Before the trusted time data is used, possibly at some very much later time, the validity of the trusted time data is tested (step 140). In one embodiment, the trusted time data includes a first counter value that is obtained from a local counter on the computer when the first local time is obtained from the local clock circuit. The validity of the trusted time data is tested by obtaining the first counter value from the trusted time data and comparing it to a current counter value obtained from the local counter. If the first local counter value and the current counter value differ, then the method can report the failure (step 150). If the first local counter value and the current counter value are the same, then the trusted time data is used to compute a local trusted time corresponding to a second local time (step 160). The trusted time is computed by summing the second local time and the time difference obtained from the trusted time data.

Figure 2:
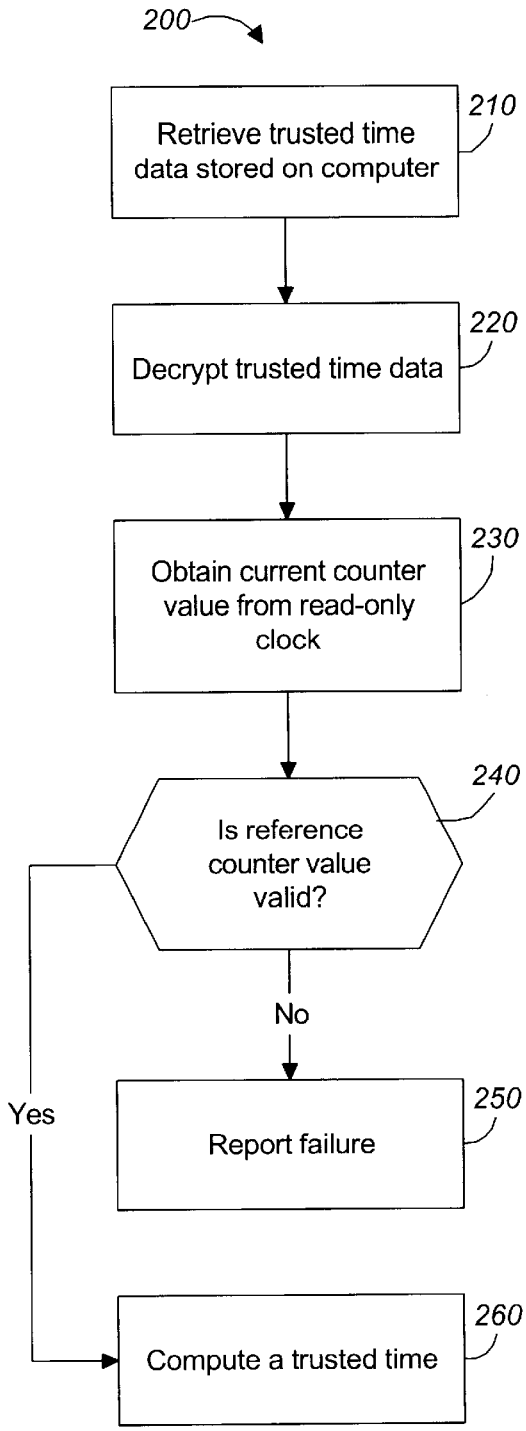
FIG. 2 is a flow diagram illustrating a method for determining a trusted time in accordance with the invention.

FIG. 2 illustrates a method 200 for determining a trusted time on a computer. Trusted time data is retrieved from local storage on the computer (step 210), which generally will have been obtained at some indefinite earlier time from a trusted source. The integrity of the trusted time data is protected by encryption—for example, it can be signed with a digital signature or it can be encrypted, for example with a private key. The data includes a time difference and a reference counter value. The time difference represents the difference between a local time on the computer and a trusted time. Then, the trusted time data is recovered and its integrity is confirmed, for example by decrypting the data (step 220). If encrypted with a private key, the trusted time data would be decrypted with a corresponding public key. A current counter value is obtained from a read-only counter on the computer, which is coupled to a local clock circuit in the computer (step 230). The validity of the reference counter value is tested by comparing the reference counter value to the current counter value (step 240). If the reference counter value is not valid, then the method can report the failure (step 250). In one implementation, the reference counter value is not valid if it is not the same as the current counter value; the reference counter value is valid if it is the same as the current counter value. If the reference counter value is valid, then the trusted time data is used to compute a trusted time (step 260). In one implementation, the trusted time data includes a time difference, and the trusted time can be computed by summing the time difference and a local time obtained from the computer.

Figure 3:
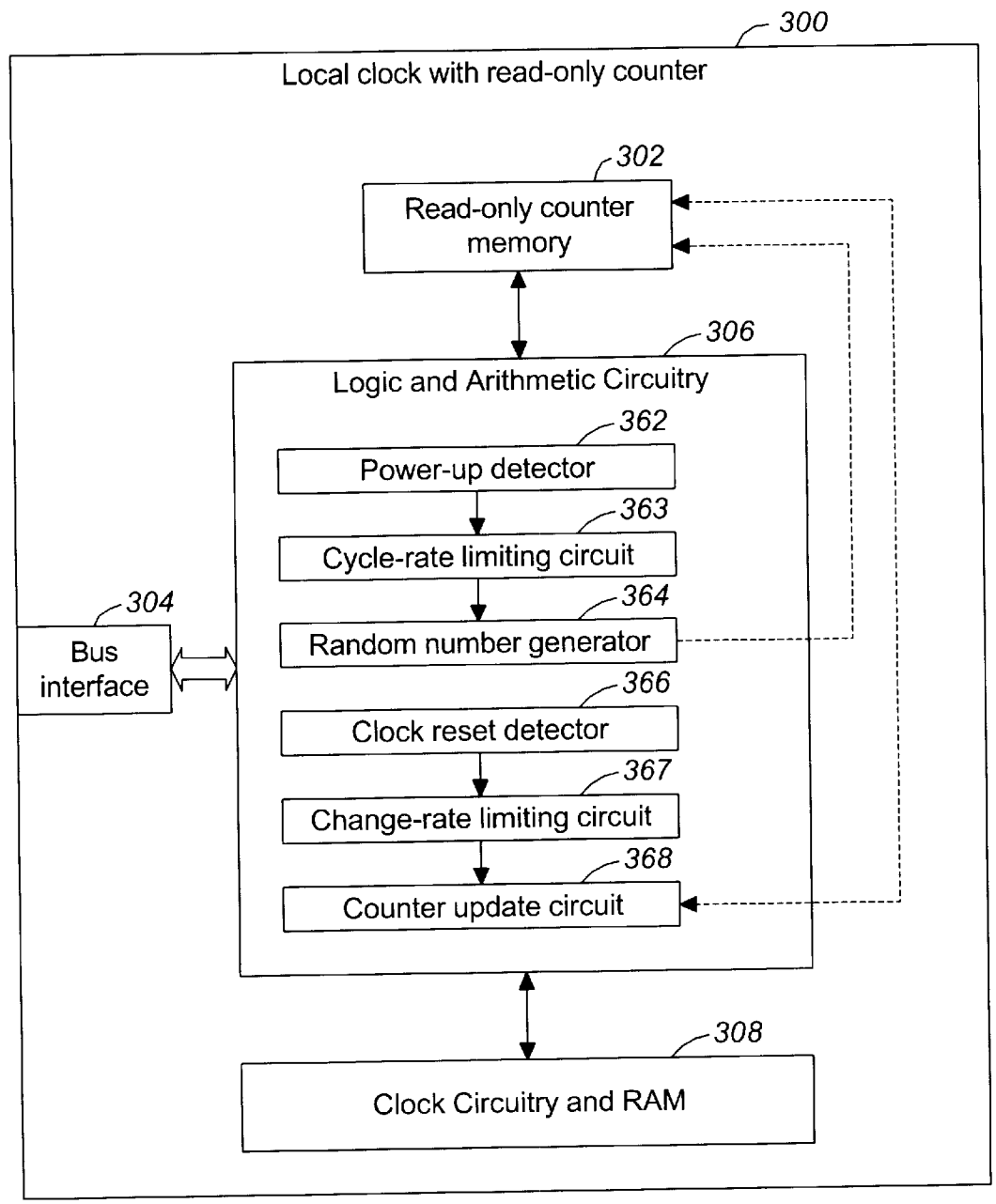
FIG. 3 is a block diagram of a local clock and read-only counter circuit suitable for use with the methods of the invention.

FIG. 3 is a block diagram of a local clock and read-only counter circuit 300 having the features described above. The clock-and-counter circuit 300 has a counter memory 302 (such as a dedicated register or a dedicated portion of a random access memory) for storing the counter value of the read-only counter. The circuit 300 may be implemented in a separate package or as part of a larger circuit, such as a microprocessor or embedded processor. The circuit 300 has one or more bus interfaces 304 over which to receive and furnish control signals and data. The circuit 300 includes logic and arithmetic circuitry 306 and clock circuitry and RAM 308 for generating and storing local time.

The logic and arithmetic circuitry 306 performs the functions required of the clock-and-counter circuit 300 to support the secure time features described above. In a conventional manner, the logic and arithmetic circuitry 306 provides an interface defined by an address map. Counter values and any other data and status values are obtained by reading the appropriate memory bytes defined by the address map. Operations such as the update operation are requested by writing to set control bits in the appropriate memory bytes defined by the address map. When the clock is reset, that is, whenever an event occurs that causes a break in the time reported by the clock, reset detector circuitry 366 detects the event and counter update circuitry 368 updates the counter memory 302. When a power-up condition is detected by detector 362, a random number is generated by generator 364 and stored as the counter value in the counter memory 302. The random number generator 364 can implement any technique that generates a non-predictable random number within the range of possible counter values. To avoid the risk that access to the seed of a pseudo-random technique will compromise the integrity of the read-only counter, an analog white noise generation circuit can be included in the generator 364, which then amplifies and digitizes the white noise output and from the digitized value generates a counter value as a random sequence of bits.

Also to discourage attacks on the security of the clock, the circuitry 306 can include circuitry 363 to limit the frequency with which power up conditions can occur and circuitry 367 to limit the frequency with which clock reset operations can occur.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method for providing a trusted time, comprising:

sending a first local time from a computer to a trusted server, the first local time being obtained from a local clock circuit operating to maintain a local time for the computer, the computer and local clock circuit being of a kind where a user can freely reset the local clock circuit;

receiving trusted time data protected by a digital signature or encryption from the trusted server, the trusted time data representing a correction that when added to the first local time results in a corresponding trusted time;

storing the trusted time data on the computer; and on the computer, testing the validity of the trusted time data stored on the computer with respect to a state of the local clock circuit and, if the data is valid, using the trusted time data to compute a second trusted time corresponding to a second local time obtained from the local clock circuit by adding the correction to the second local time.

2. The method of claim 1, wherein:

the computer has a read-only local counter securely coupled to the local clock circuit, the local counter and local clock circuit operating to change a counter value of the local counter whenever the local clock circuit is reset in a way that changes the local time provided by the local clock circuit;

a first counter value is obtained from the local counter when the first local time is obtained from the local clock circuit, and the first counter value is sent to the trusted server with the first local time;

the trusted time data received from the trusted server includes the first counter value; and the validity of the trusted time data with respect to state of the local clock circuit is tested by obtaining the first counter value from the trusted time data and comparing it to a current counter value obtained from the read-only local counter.

3. The method of claim 2, wherein:
the local counter value is changed by incrementing it by one.

4. The method of claim 2, wherein:
the local counter value is changed by resetting it to a random value.

5. The method of claim 2, wherein:
the frequency with which local clock circuit can be reset is limited.

6. The method of claim 2, wherein:
the frequency with which local clock circuit can be powered up is limited.

7. The method of claim 2, wherein the read-only local counter operates to reset its value to a random value whenever the local clock circuit is powered up.

8. The method of claim 7, wherein:
the trusted time data is protected by being encrypted with a private key of the trusted server; and
a trusted software module running on the computer decrypts the trusted time data using a corresponding public key of the trusted server.

9. The method of claim 8, further comprising:
interacting with the trusted server to obtain trusted time data whenever a user resets the local clock circuit.

10. The method of claim 8, further comprising:
obtaining multiple instances of trusted time data over a period of time from the trusted server with the same first counter value;
using the multiple instances of trusted time data to estimate any drift of the local clock circuit; and
using the estimated drift to correct the trusted time on the local computer.

11. The method of claim 8, wherein the computer is embedded in a personal digital assistant.

12. The method of claim 8, wherein the computer is embedded in a digital appliance.

13. The method of claim 8, wherein the sending and receiving of information between the computer and the server occurs over the Internet.

14. The method of claim 8, wherein the sending and receiving of information between the computer and the server occurs over a wireless connection.

15. The method of claim 8, wherein the local counter and the local clock circuit are implemented within a single semiconductor chip.

16. The method of claim 8, wherein the local counter and the local clock circuit are implemented within a single semiconductor chip along with the central processing unit of the computer.

17. The method of claim 2, wherein the trusted time data includes the first local time, the first counter value, and a trusted time corresponding to the first local time.

18. The method of claim 2, wherein the trusted time data includes the first local time, the first counter value, and a difference between the first local time and a trusted time corresponding to the first local time.

19. The method of claim 2, wherein the trusted server provides a standard time reference.

20. A method for determining a trusted time, comprising:
retrieving trusted time data stored locally on a computer, the trusted time data defining a reference counter value and a time correction, the trusted time data being protected by encryption or a digital signature;
obtaining the reference counter value and the time correction from trusted time data by decrypting the trusted time data or confirming the digital signature;
obtaining a current counter value from a read-only counter coupled to a clock in the computer; and
testing the reference counter value against the current counter value and, if the reference counter value is valid, adding a local time obtained from the clock and the time correction to compute a trusted time.

21. The method of claim 20, wherein the reference counter value is valid if and only if the reference counter value matches the current counter value.

22. A computer program product, tangibly stored on a computer-readable medium, for providing a trusted time, comprising instructions operable to cause a programmable processor to:
send a first local time from a computer to a trusted server, the first local time being obtained from a local clock circuit operating to maintain a local time for the computer, the computer and local clock circuit being of a kind where a user can reset the local clock circuit;
receive trusted time data from the trusted server, the trusted time data representing a correction that when added to the first local time results in a corresponding trusted time, the trusted time data being protected by encryption or a digital signature;
store the trusted time data on the computer; and
test the validity of the trusted time data stored on the computer with respect to state of the local clock circuit and, if the data is valid, use the trusted time data to compute a second trusted time corresponding to a second local time obtained from the local clock circuit by adding the correction to the second local time.

23. The computer program of claim 22, wherein the computer program is embedded in a memory of a personal digital assistant.

24. A computer program product, tangibly stored on a computer-readable medium, for determining a trusted time, comprising instructions operable to cause a programmable processor to:
retrieve trusted time data stored locally on a computer, the trusted time data defining a reference counter value and a time correction, the trusted time data being protected by encryption or a digital signature;
obtain the reference counter value and the time correction from trusted time data by decrypting the trusted time data or confirming the digital signature;
obtain a current counter value from a read-only counter coupled to a clock in the computer; and
test the reference counter value against the current counter value and, if the reference counter value is valid, adding a local time obtained from the clock and the time correction to compute a trusted time.

25. A product of claim 24, wherein the computer program is embedded in a memory of a personal digital assistant.

26. A system, comprising:
a local clock circuit, the local clock circuit operating to maintain a local time for the system, the system and local clock circuit being of a kind in which a user can freely reset the local clock circuit, the local clock circuit having a state that is updated when the local clock circuit is reset;
means for sending a first local time from the system to a trusted server, the first local time being obtained from the local clock circuit;
means for receiving trusted time data protected by encryption or digital signature from the trusted server, the trusted time data representing a correction that when added to the first local time results in a corresponding trusted time;

means for storing the trusted time data in the system; and means for testing the validity of the trusted time data stored in the system with respect to the state of the local clock circuit and, if the data is valid, using the trusted time data to compute a second trusted time corresponding to a second local time obtained from the local clock circuit by adding the correction to the second local time.

27. A system, comprising:

a clock operating to maintain a local time for the system, the system and clock being of a kind in which a user can freely reset the clock;

a read-only counter coupled to a clock and providing a counter value, the counter and the clock operating to update the counter value whenever the clock is reset;

means for retrieving encryption-protected trusted time data stored locally on a system, the protected data defining a reference counter value and a time correction;

means for decrypting the trusted time data or confirming a digital signature for the trusted time data;

means for obtaining a current counter value from the read-only counter; and means for testing the reference counter value against the current counter value and, if the reference counter value is valid, adding a local time obtained from the clock and the time correction to compute a trusted time.

\* \* \* \* \*